Figure 1:
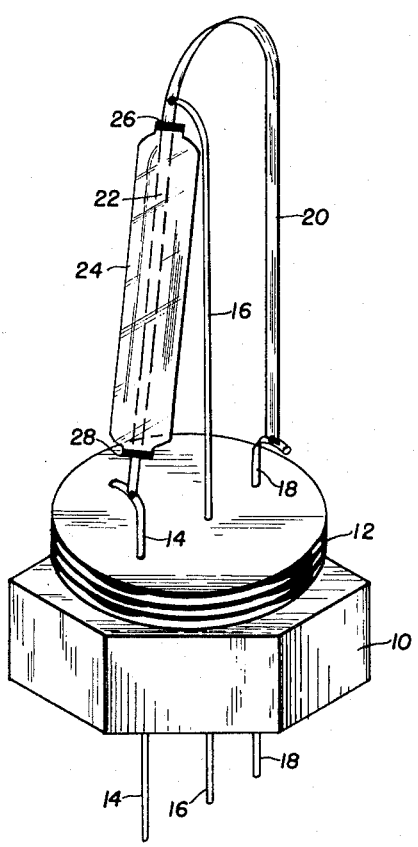

Oct. 10, 1961     E. SCHASCHL ET AL     3,004,232
CORROSION TEST PROBE
Filed June 6, 1960

INVENTORS
GLENN A. MARSH
BY   EDWARD SCHASCHL

*Edward H. Lang*
ATTORNEY

3,004,232
CORROSION TEST PROBE
Edward Schaschl and Glenn A. Marsh, Crystal Lake, Ill., assignors to The Pure Oil Company, Chicago, Ill., a corporation of Ohio
Filed June 6, 1960, Ser. No. 34,046
7 Claims. (Cl. 338—13)

This invention relates to a corrosion-test probe designed to measure directly the difference in the corrosion rates of two electrically conductive test specimens exposed to differing corrosive conditions existing in a single electrolytic environment. In a more particular aspect, this invention relates to a corrosion probe having two corrodible metallic test specimens, both of which specimens are bare and one of which is enclosed in a fluid-tight, electrolytically-permeable vessel, containing an electrolyte in contact with the enclosed test specimen.

The prior art teaches the use of corrosion-test probes adapted to support and provide electrical contact with two strip-like metallic specimens, one of which is coated with a corrosion-impervious material so that it will function as a temperature-compensating reference specimen. These test probes utilize methods which have been devised to make use of the correlation between change in electrical conductivity and change in cross-sectional area of an electrically-conductive specimen to determine the rate of corrosion of specimens fabricated of various materials of construction, through the use of a corrosion-test probe connected to an electric-resistance-change meter. These instruments, known and widely used in the art, employ resistance bridges and function as analogue computers to indicate quantitatively a change in physical characteristics which cannot be conveniently measured by other methods. There are several recent modifications of this principle. One such modification is described in a copending application of the instant inventors filed August 12, 1955, Serial Number 528,032. This application describes means for compensating for temperature changes wherein one test specimen is mounted in a position exposed to the corrosive environment, and another test specimen is isolated or protected from the corrosive effects of the environment by means of a suitable protective coating placed thereon. The coupons or test specimens are connected in a circuit so as to comprise one half of a typical resistance bridge. Suitable electrical connections are made with the other half of the bridge, which is placed outside of the corrosive environment together with the power supply to the bridge. An appropriate electrical meter, such as a galvanometer, functions as a null detector. Loss of metal from the unprotected specimen induces small increases in resistance in the circuit, which increases are proportional to the metal loss of the unprotected specimen. Metal loss can be calculated by appropriate formulae described in the aforenamed copending application.

The corrosion-test probe of the instant invention may be used in conjunction with the electronic circuitry described in the foregoing application. Other resistance-ratio change-measurement devices may also be used. The corrosion-test probe of this invention is in part an improvement over the test probes previously proposed in that it is adapted to permit the direct measurement of the difference in corrosion rates of two metallic specimens disposed in differing but electrolytically connected corrosive environments.

It becomes therefore a primary object of this invention to provide a corrosion-test probe to be used with an electrical resistance-measuring apparatus to determine the difference in corrosivity of two corrosive environments. Another object of this invention is to provide a new form of corrosion-test probe adapted for use in electrolytic-cell corrosion studies. Yet another object of this invention is to provide a test probe peculiarly adapted for electrolytic-cell corrosion studies in which the cell action is produced by differences in the composition of the corrosive environment in contact with separate but electrically connected portions of a corrodible metal.

Briefly, the test probe of this invention consists of a probe base which supports first and second corrodible test specimens, the first of said specimens being enclosed in a vessel capable of retaining a desired corrosive environment in contact with said first specimen, without electrolytically isolating the first specimen from the second. The second specimen is unprotected and exposed directly to the corrosive environment under study. Electrical lead wires are provided to permit connection of the test specimens in a resistance-ratio change-meter circuit.

Figure 2:
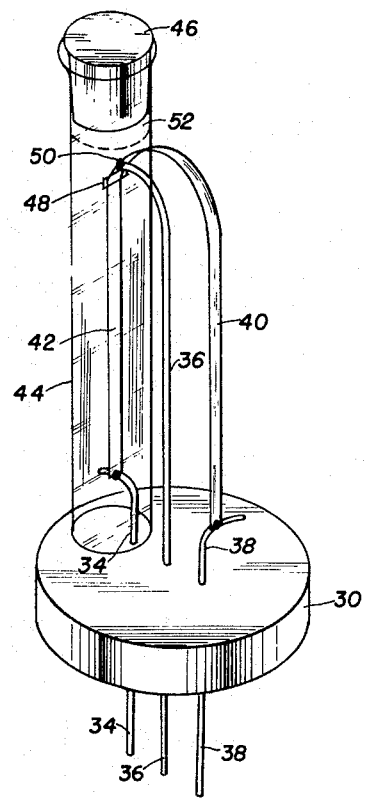
Figure 3:
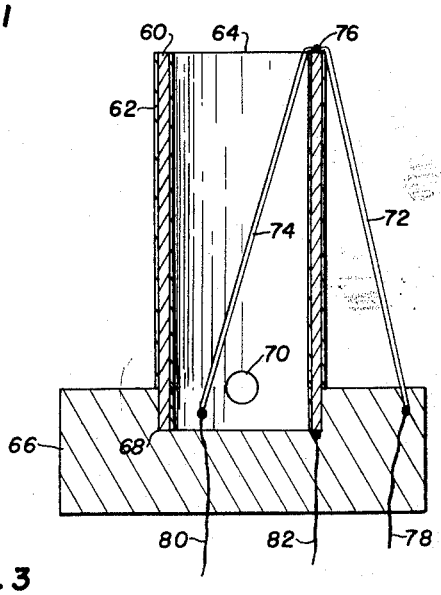

This invention is best described with reference to the drawings, of which:

FIGURE 1 is an isometric view of the novel test probe.
FIGURE 2 is an isometric view of a second novel test probe constructed in accordance with this invention.
FIGURE 3 is a cross-sectional view of a third test probe fabricated in accordance with this invention.

Referring to FIGURE 1, base 10 is threaded at 12 for insertion in a standard pressure-vessel fitting. Three conductors, 14, 16, and 18, extend through base 10 in electrically insulated relationship therewith. Two elongated, ribbon-like, or wire, test specimens 20 and 22 are electrically connected to and mechanically supported by the three conductors, 14, 16, and 18. Specimens 20 and 22 may be separate ribbons or wires of corrodible metal, or alternatively, may be a single ribbon or wire of corrodible metal which is divided into two portions or specimens by the connection with conductor 16. The three conductors are preferably coated with an electrically-insulating, corrosion-impervious material such as plastic, enamel, or an epoxy resin. Test specimen 22 is surrounded by sleeve 24, which sleeve is fabricated of a semi-permeable solid material. The semi-permeable solid materials used to fabricate sleeve 24 may be any of various substances which have the property of permitting the flow of molecules or ions, but act as a shield to prevent the passage of fluids generally. Known semi-permeable materials which may be utilized in fabricating the test probe of this invention include fritted glass, porous stainless steel, animal tissue, agar-agar, silical gel, and alumina gel. Also suitable are numerous resins which are commonly used in making semi-permeable barriers. Where the material selected is of itself too soft to provide sufficient rigidity, a plastic screen, or an insulation-coated metallic screen, may be fabricated to the desired sleeve-like shape, and then coated with the barrier material, such as agar-agar, by dipping.

The purpose of sleeve 24 is to produce a zone of electrolyte surrounding specimen 22 which differs in some respect from the corrosive electrolyte into which the probe is inserted. This difference may be one of chemical composition, of concentration, or of degree of fluid movement. Where sleeve 24 is intended to serve only as a physical barrier to produce a quiescent zone surrounding specimen 22 in the corrosive environment in which the probe is to be inserted, the sleeve may be left open at its ends 26 and 28. Where it is desired to maintain a zone differing in composition or in concentration from the corrosive medium which will surround the probe generally, and test specimen 20 particularly, a seal must be provided between ends 26 and 28 of the sleeve and test specimen 22. The sleeve thus forms a vessel within which the desired electrolytic fluid is retained. The sleeve must be electrolytically permeable to maintain the sheltered specimen 22 and the exposed specimen 20 in electrolytic contact with each other. This electrolytic contact is essential to the electrolytic corrosion process which the novel test probe is intended to measure.

FIGURE 2 depicts another test probe constructed in accordance with this invention. Conductors 34, 36 and 38 pass through base 30, and are connected to test specimens 40 and 42. Fritted-glass tube 44 is supported by base 30 and projects outward from the base. Plug 46 seals the extended end of tube 44. Test specimen 42 passes through the side wall of the tube at 48 where a fluid-tight glass-to-metal seal is provided. Conductor 36 is shown to contact specimens 40 and 42 at a point 50 outside of glass tube 44. It is evident that conductor 36 may alternatively extend within fritted-glass tube 44 and contact specimens 40 and 42 at a point just inside tube 44 adjacent to the glass-to-metal seal. An electrolytic fluid of interest, 52, is enclosed within the fritted-glass tube. Thus specimen 40 is bare and exposed to a corrosive environment into which the probe may be inserted. Test specimen 42 is in contact with the selected electrolyte, which may be corrosive, enclosed in the vessel formed by tube 44 in cooperation with base 30 and plug 46. Since the frited glass provides a permeable barrier, the zones within and without the tube are physically isolated, but remain in electrolytic contact. Thus specimens 40 and 42 are in electrolytic contact, and electrolytic corrosion can occur.

FIGURE 3 depicits a third embodiment of the test probe of this invention. Sleeve 60 is fabricated of an electrically-conductive metal, and is provided with an electrically-insulating, corrosion-inhibiting coating, 62, which covers both the inside and outside of sleeve 60. The sleeve is open at its projecting end 64, and is supported by base 66 at the opposite end 68. A plurality of apertures 70 are provided adjacent to the base-supported end of the sleeve. Alternatively, a plurality of apertures may be provided throughout the length of the sleeve. Test specimens 72 and 74 are electrically connected to sleeve 60 at point 76. Three electrical conductors 78, 80, and 82 are connected to the other ends of test specimens 72 and 74, and to the base end of sleeve 60, respectively. Thus sleeve 60 serves as one of the electrical conductors and makes contact with the ends of the test specimens remote from base member 66. In this case, the sleeve surrounding second test specimen 74 is intended to produce a quiescent zone in the corrosive environment into which the probe is inserted. The sleeve is obviously incapable of maintaining an electrolyte differing in composition or concentration from the corrosive environment generally. Since the purpose of the sleeve is merely to produce a quiescent zone, it need not be sealed to specimen 74 and need not be fluid tight. Accordingly, a semi-permeable barrier need not be used to fabricate the sleeve, but if a metal is used, it must be coated to electrically insulate the sleeve from the corrosive environment and prevent undesirable cell action between the test specimens and the sleeve.

The novel test probe of this invention is useful in investigating many types of cell action within the environment under study. For example, the effect of variations and differences in dissolved oxygen content in a corrosive medium can be determined by filling sleeve 44 of the probe depicted in FIGURE 2 with a corrosive electrolyte identical with that into which the probe is to be inserted except that it has a greater or lesser oxygen concentration. In the same way, the effects of variations and differences in the pH of the fluids in contact with the test specimens can be determined. The results of such studies can be interpreted in terms of long-cell effects, and used to predict the extent of corrosion which may be attributed to long-cell action. Similarly, the probe can be used to investigate crevice corrosion wherein concentration-cell effects play an important role. Where crevices exist in the surface of a metal under corrosive attack, due to the remoteness of the zone within the crevice from the corrosive fluid body generally, and to the low fluid movement within the crevice, the composition or concentration of the corrosive fluid within the crevice will differ from that of the corrosive body as a whole. Such a situation can be simulated using the probe of this invention, and the probable effects of crevice corrosion can readily be determined. In still another use, the probe of FIGURE 3 can be employed to determine the effect of agitation or fluid movement upon corrosion. This is because test specimen 40 of FIGURE 3 is exposed to the conditions of agitation or fluid flow existing in the corrosive body under tests. Sheltered element 74 is exposed to the same corrosive fluid, but the fluid is in a quiescent state.

To further explain the operation of the test probes of this invention, specific illustrating examples of the use of the probes will be set out. A probe as depicted in FIGURE 3 is inserted in a corrosive environment having a low electrolytic conductivity. This low electrolytic conductivity of the corrosive fluids which contact both the sheltered and bare test specimens limits and controls the extent of electrolytic corrosion occurring between the two test specimens at a very low level. The predominating corrosive process is one of local cell action, that is, the two specimens corrode independently. Increases and decreases in the oxygen content of the corrosive environment affect both test specimens in substantially the same way, the effect of the increased oxygen being to accelerate local cell action. Under these conditions, both specimens corrode at approximately the same rate, and this is indicated by the measuring circuit and meter used in conjunction with the probe. Assuming now that the corrosive environment becomes agitated, or that the fluid commences to flow at relative high velocities, the agitation or fluid flow will affect the exposed test specimen, but will not affect, or affect only to a much lesser extent, the sheltered test specimen. Accordingly, the exposed test specimen corrodes at a more rapid rate, and the difference in the rates of corrosion of the two specimens is indicated directly by the corrosion meter used in conjunction with the probe.

Assume now that the probe of FIGURE 3 is disposed in a corrosive environment having a high electrolytic conductivity. This high conductivity permits extensive long-cell action to occur, provided there is some driving force making one of the test specimens anodic with respect to the other. Assuming conditions of moderate oxygen concentration and low or no agitation or fluid velocity, the oxygen concentration in the zone adjacent to each specimen will be approximately the same, and neither specimen will be strongly anodic or cathodic with respect to the other. The predominant action will be local-cell action, and both specimens will corrode at about the same rate. The corrosion meter will so indicate by remaining in the zero or balanced position. Assume now that the corrosive environment becomes highly agitated. One test specimen is directly affected by this agitation, but the other remains in a quiescent zone within the protecting sleeve. Soon the oxygen concentration in the zone surrounding the sheltered specimen drops to a level substantially below the oxygen concentration adjacent to the unsheltered specimen. When this occurs, the sheltered specimen becomes anodic with respect to the unsheltered specimen, and since electrolytic conductivity between the two specimens is high, the predominant corrosive mechanism is long-cell action between the two specimens, the sheltered specimen corroding at a rate many times the corrosion rate of the exposed specimen. The corrosion meter directly indicates the difference in the corrosion rates of the two specimens.

Assume now that it is desired to determine the effects of hydrogen-ion concentration and agitation upon long-cell action. A deaerated solution of sodium chloride having a neutral pH is placed in the annular space of a probe of the type shown in FIGURE 2, and the probe is subjected to a corrosive electrolytic environment of moderate oxygen concentration. The fluid velocity in the corrosive environment is about 1 inch per second. It is found that under these conditions the sheltered test specimen, being strongly anodic with respect to the exposed specimen, corrodes at a rate far more rapid than the exposed specimen. This experiment is repeated with pH values ranging from 2 to 8. It is found that the sheltered specimen corrodes at a far more rapid rate when the pH of the solution in contact with the protected specimen is in the range of 2 to 3.3, or in the range of 3.6 to 8. In the pH range from 3.3 to 3.6, it is found that the bare specimen corrodes at a more rapid rate. When the experiments are repeated using lesser oxygen concentrations in the corrosive environment, and corrosive environments having lower flow rates, it is found that the safe range in which little long-cell corrosion occurs, that is the pH range of 3.3 to 3.6, is extended.

The foregoing examples of the use of the test probe of this invention in electrolytic corrosion studies are merely exemplary, and are set out to explain the manner in which the probe may be used. The test probe of this invention is useful, however, whenever it is desired to study the effects of long-cell action under conditions where the driving force of the cell action arises from differences in the composition or concentration of the corrosive fluid at the points between which cell action occurs, or arises from differences in the degree of fluid flow or fluid agitation at the points between which the cell action occurs.

The embodiments of the invention in which a special property or privilege is claimed are defined as follows:

1. A corrosion-test probe comprising first and second elongated, electrically-conductive, corrodible test specimens fabricated of the same material of construction, first and second electrical conductors connected respectively to one end of each of said first and second test specimens, a third conductor connected to each of the remaining ends of said specimens, and a sleeve encompassing a major portion of the length of said first specimen to produce a quiescent zone adjacent to said first specimen without electrolytically isolating said first specimen from said second specimen, said second specimen being disposed without said sleeve.

2. A probe in accordance with claim 1 which said sleeve is a portion of a fluid-tight, semi-permeable vessel enclosing said first specimen.

3. A corrosion-test probe comprising a base, first and second elongated, electrically-conductive, corrodible test specimens fabricated of the same material of construction, supported by said base for exposure to a corrosive environment, a protective sleeve operably supported by said base and encompassing a major part of the length of said first specimen to produce a quiescent zone adjacent to said first specimen without electrolytically isolating said first specimen from said second specimen, and three electrical conductors extending through said base in electrical-insulated relationship, the first conductor being connected to one end of each of said specimens, and the second and third conductors being connected respectively to the other ends of said first and second specimens, said second specimen being supported without said sleeve.

4. A probe according to claim 3 in which said sleeve is a portion of a fluid-tight, semi-permeable vessel enclosing said first specimen.

5. An apparatus according to claim 4 in which said sleeve is fabricated of fritted glass.

6. An apparatus according to claim 4 in which said sleeve is fabricated of an electrically-non-conductive screen coated with a material selected from the group consisting of agar-agar, silica gel, alumina gel, and animal tissue.

7. A probe according to claim 4 in which said specimens are ribbon-like and fabricated from metallic foil.

References Cited in the file of this patent

UNITED STATES PATENTS

| | | |
|---|---|---|
| 2,864,252 | Schaschl | Dec. 16, 1958 |
| 2,869,003 | Marsh et al. | Jan. 13, 1959 |